UNITED STATES PATENT OFFICE.

EUGENE OUDINOT, OF PARIS, FRANCE.

ORNAMENTING GLASS FOR ARCHITECTURAL PURPOSES.

SPECIFICATION forming part of Letters Patent No. 266,508, dated October 24, 1882.

Application filed November 18, 1881. (No specimens.) Patented in France January 21, 1879, No. 128,576.

*To all whom it may concern:*

Be it known that I, EUGENE OUDINOT, of Paris, in the Republic of France, have invented certain new and useful Improvements in Ornamenting Glass for Architectural and other Decorative Purposes, of which the following is a specification.

The object of my invention is to provide ornamental glass for windows, and also to provide a desirable and very beautiful material for use in decorating walls, ceilings, furniture, or other articles as a substitute for tiles, earthenware slabs, and for what is known as "Cordova leather" and "Venetian mosaic," all of which have been heretofore used for the purpose of architectural and other decorations.

The invention consists in a novel process of ornamenting glass, said process consisting in first delineating the outlines of design upon glass, then coating such parts as are not included in the design with a mixture of gold-powder and a liquid composition of ground glass or silex, then covering the design with enamel, and finally subjecting the glass to the action of heat or firing it to vitrify both the enamel and the composition of gold and silex and to secure them to the glass. Glass produced by this process may be employed for windows and other purposes.

The invention also consists in a novel process of ornamenting glass, said process consisting in first delineating the outlines of the design on the glass, then covering the design with enamel, then applying gold-leaf with flux or a vitrifiable preparation of liquid gold to the back of the glass, and finally firing the glass to vitrify the enamel and secure it and the gold to opposite sides of the glass, whereby I produce a very rich and desirable substitute for Cordova leather and Venetian mosaic.

In carrying out my invention I first prepare a drawing or outline of the design on paper, and then cut the glass to be used according to the form of the figures in the design, taking care to so cut the glass that the points of juncture between the pieces, when put together with lead binding, will not mar or impair the design. I then place the pieces of glass upon the drawing or outline and copy the design in outline upon the pieces of glass with a pencil or pen and any suitable color. I then stencil upon all parts of the glass which are not covered by the design a mixture of gold-powder and a liquid preparation of ground glass or silex, and then cover all parts of the design with enamels of the desired colors. After the glass has been thus prepared or coated with gold-powder and ground glass or silex, I subject it to heat or fire it, and thereby vitrify both the coating of gold-powder and ground glass and the enamel. When the glass has cooled I secure the pieces together with ordinary lead binding, and the glass is then complete for use in windows, for screens, and for various other purposes where it is desired to have it transparent or translucent.

In case the glass is to be used for the decoration of walls, either externally or internally, or for ceilings, or other purposes where it is not necessary that it should be transparent or translucent, I first copy the drawing of the design on the glass, as above described, and then apply enamel to the design, after which I apply gold-leaf with a flux—such as bismuth—or a vitrifiable preparation of liquid gold to the back of the glass, and then subject it to the action of heat or fire it so as to vitrify the enamel and secure it on the face of the glass and secure the gold-leaf or preparation to the back of the glass.

The glass thus prepared is opaque and presents an appearance similar to Cordova leather or Venetian mosaic, for either of which it forms a desirable substitute.

The coating of gold-powder and ground glass or silex gives the glass a dusty and antique appearance; but in some cases it may not be necessary to apply either this or the gold-leaf, and in such case I simply apply the enamel to form the design, and then fire the glass to vitrify the enamel. The enamel, although in relief, will keep its transparency.

When the glass decorated as above described is used for wall or ceiling decoration the lead binding would detract somewhat from the appearance of the design, and I may therefore dispense with the lead binding and secure the pieces of glass on the wall, ceiling, or other surface to be ornamented, by adhesive substance or cement, and also by small nails or tacks at the corners or other isolated points, and the pieces may be so nicely fitted together that the joints will hardly be perceptible.

What I claim as my invention, and desire to secure by Letters Patent, is—

1. The process of ornamenting glass, consisting in first delineating the outlines of the design upon the glass, then coating such parts of the glass as are not included in the design with a mixture of gold-powder and a liquid composition of ground glass or silex, then covering the design with enamel of the desired color or colors, and finally subjecting the glass to the action of heat or firing it, substantially as and for the purpose herein described.

2. The process of ornamenting glass, consisting in first delineating the outlines of the design upon the glass, then covering the design with enamel of the desired color or colors, then applying gold-leaf and flux or a vitrifiable preparation of liquid gold to the back of the glass, and finally subjecting the glass to the action of heat or firing it, to vitrify both the enamel and gold and secure them to opposite sides of the glass, substantially as and for the purpose herein described.

EUG. OUDINOT.

Witnesses:
ROBT. M. HOOPER,
GEORGE WALKER.